United States Patent [19]

Dubler et al.

[11] Patent Number: 5,095,483
[45] Date of Patent: Mar. 10, 1992

[54] SIGNATURE ANALYSIS IN PHYSICAL MODELING

[75] Inventors: James F. Dubler; Steven G. Robinson; David A. Valashinas, all of Austin, Tex.

[73] Assignee: International Business Machines Corporation, Armonk, N.Y.

[21] Appl. No.: 735,672

[22] Filed: Jul. 26, 1991

Related U.S. Application Data

[63] Continuation of Ser. No. 345,322, Apr. 28, 1989, abandoned.

[51] Int. Cl.⁵ .............................................. G06F 11/00
[52] U.S. Cl. .................................... 371/25.1; 371/23
[58] Field of Search ................. 371/25.1, 20.4, 22.1, 371/22.4, 67.1, 27, 23

[56] References Cited

U.S. PATENT DOCUMENTS

| | | | |
|---|---|---|---|
| 3,961,250 | 6/1976 | Snethen | 371/23 |
| 3,976,864 | 8/1976 | Gordon et al. | 371/26 |
| 4,571,724 | 2/1986 | Belmondo et al. | 371/22.1 |
| 4,587,614 | 5/1986 | Couch | 371/28 |
| 4,682,246 | 7/1987 | Efron et al. | 371/24 |
| 4,769,761 | 9/1988 | Downes et al. | 371/4 |
| 4,801,870 | 1/1989 | Eicheberger et al. | 371/22.4 |

Primary Examiner—Jerry Smith
Assistant Examiner—Ly V. Hua
Attorney, Agent, or Firm—Douglas H. Lefeve

[57] ABSTRACT

In performing a series of device evaluation cycles relative to pins of a physical electronic model, a signature associated with an immediately preceding device evaluation cycle is compared to the corresponding signature that exists just prior to the last pattern for the current device evaluation cycle. If the signatures compare, the new pattern of the current evaluation cycle is completed. If the signatures do not compare, an error has occurred and the operator is notified so that this series of device evaluation cycles will not be considered valid. Computer simulation information is employed to determine the optimal times to clock signatures with each signal pin having its own programmable clocking circuit. These optimally generated signatures are used to verify the consistent operation of the physical model.

10 Claims, 3 Drawing Sheets

SIGNATURE ANALYSIS IN PHYSICAL MODELING

This is a continuation of application Ser. No. 07/345,322 filed Apr. 28, 1989, now abandoned.

FIELD OF INVENTION

This invention relates generally to testing or physical modeling of electronic circuits, and more particularly to verifying the consistency of operation of electronic components.

BACKGROUND ART

In the field of testing digital electronic circuits, signature analysis has proved to be a successful method for determining the correct operation of the device under test (DUT). The basic technique of signature analysis is to reduce a stream of measured digital values associated with inputs to or outputs from the pins of the DUT to a simple unique signature. Hardware implementations of signature analyzers share several common features. There is commonly a shift register, feedback summing circuits, and a clock circuit. A signature is derived by summing, at each clock cycle, the just measured response with predefined bits from the shift register. Then the summation is shifted into one end of the shift register while dropping the bit on the other end of the shift register. These two steps may be repeated any number of clock cycles, thereby substantially reducing the data necessary to represent long streams of patterns.

Although this process reduces test time and cost, many electronic circuits cannot take advantage of this method of reducing test data. A major problem arises when the clock for the signature analyzer occurs when the measured response of the DUT is at an indeterminate value. This indeterminate value may result from:

1) a bidirectional bus in the high impedance state, or
2) a latch that has not been reset or initialized, or
3) a race or other unstable condition, or
4) a time when fast circuits may correctly result in one value and slow circuits may result in another value.

Each indeterminate value that is clocked into the summing circuit doubles the number of good signatures possible and halves the probability of generating unique signatures that will identify failures. This exponential growth in data and exponential drop in accuracy rapidly negates the benefits of signature analysis.

References to methods attempting to circumvent this problem for special cases are found in the prior art, but none describes a general method. For example, one technique synchronizes the signature clock with the DUT clock, as taught by U.S. Pat. No. 4,534,030. Articles in the IBM *Technical Disclosure Bulletin*, Oct. 1984 at pages 2749-2750 and Dec. 1984 at pages 3845-3847, have suggested complex methods that synchronize and degate the signature clock based on the specific DUT signals.

Less successfully, signature analysis has been used to diagnose failing electronic circuit assemblies. Signature analysis has not, heretofore, been used in the field of physical modeling.

Physical modeling is the field of computer simulation of electronic circuits wherein, in addition to the computer simulation of a substantial portion of an entire electronic circuit, actual hardware circuits and simulator interface programs, in addition to the traditional software behavior models, are used in the simulation process to represent another portion of the entire electronic circuit.

In the field of physical modeling, U.S. Pat. No. 4,590,581 describes an iterative technique in which the accumulated simulation patterns are reapplied to the physical model. Each new pattern is incrementally added to the set of previous patterns and then reapplied to the physical model in its entirety. Every iteration has to perform identically for their common set of patterns or erroneous computer simulation results will occur. Depending on the purpose of the computer simulation, the erroneous results could result in incorrect test data, logic design verification, or microcode verification results. A partial list of potential reasons why one iteration may deviate from previous iterations is as follows:

1) a temporary AC line variation due to a lighting storm, power station fluctuations, load surges, etc.,
2) an intermittent connection of a signal pin that changes continuity due to wind, being bumped, thermal expansion/contraction, etc., or
3) a modeled device which does not reset to the identical state each and every iteration.

Current physical modeling systems ignore these potential problems, and leave the user to debug the erroneous results. Typically, the user will rerun the simulation and the problem will disappear. While the potential for such integrity problems may be relatively low, as the use of physical modeling has become more prevalent and simulation run times have increased, this problem has become unacceptable. It would, therefore, be of great benefit in the field of testing and physical modeling to generate output pin signatures having unquestionable integrity, and to use such signatures to add accuracy to the entire electronic hardware simulation process.

SUMMARY OF INVENTION

Accordingly, computer simulation information is employed to determine the optimal times to clock signatures with each signal pin having its own programmable clocking circuit. This optimally generated signature is used to verify the consistent operation of the physical model. In performing a series of device evaluation cycles relative to pins of a physical device, a first set of patterns of the signature associated with the just previous evaluation cycle is compared to the signature that exists just prior to another, new pattern of the current evaluation cycle. If the signatures compare, the last pattern of the current evaluation cycle is completed. If the signatures do not compare, an error has occurred and the operator is notified so that this series of device evaluation cycles will not be considered valid.

The foregoing and other objects, features, extensions, and advantages of the invention will be apparent from the following more particular description of preferred embodiments of the invention as illustrated in the accompanying drawings.

DESCRIPTION OF THE PREFERRED EMBODIMENTS

Figure 1:
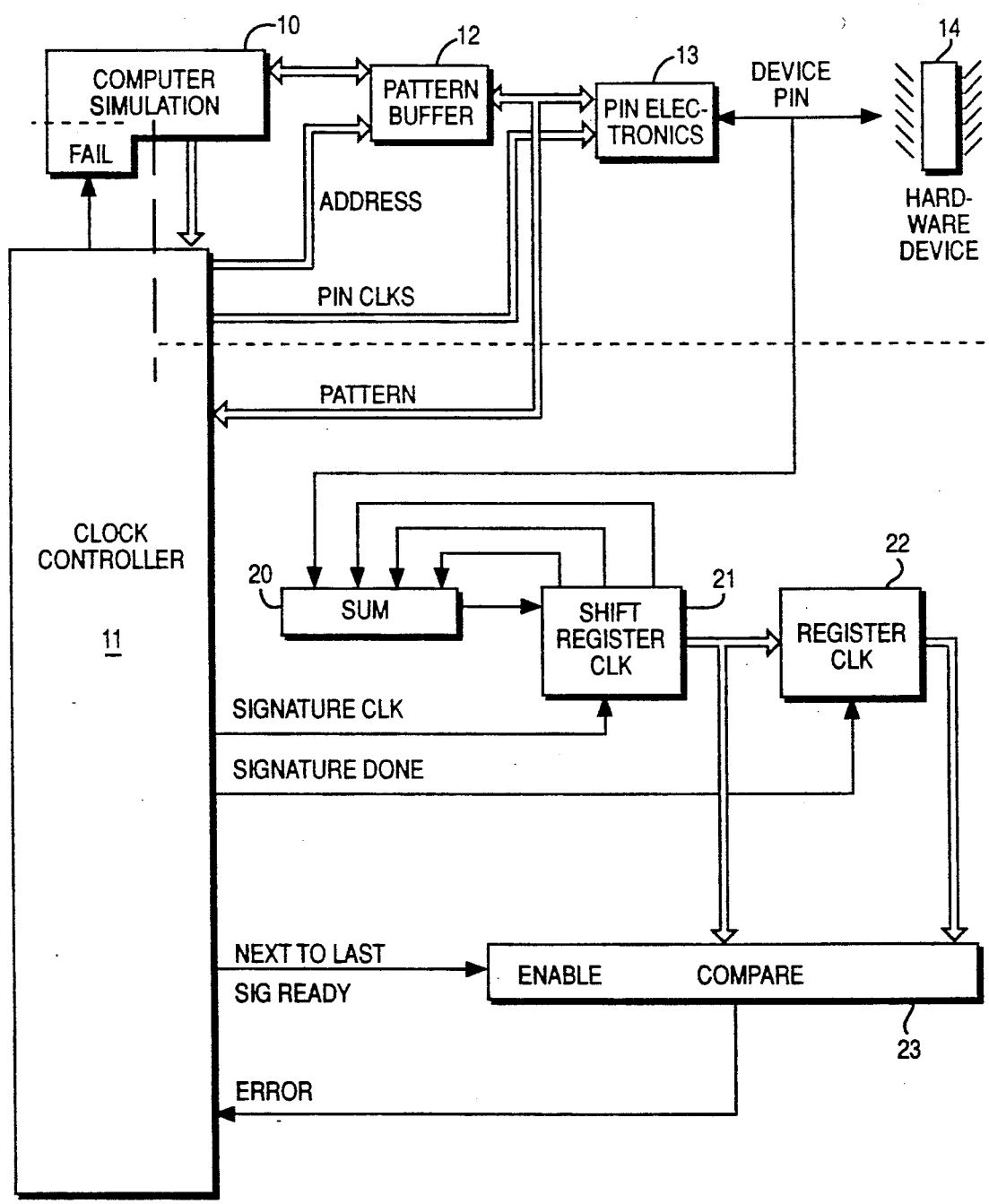
FIG. 1 is a block diagram of a digital logic simulation system employing a physical model, including the signature comparison enhancement of this invention.

FIG. 1 depicts one embodiment of this invention in digital logic simulation using physical models. The digital logic simulation objectives typically include verification of a logic design's function and timing. Additionally, logic simulation is often used to generate test pattern stimuli and responses.

FIG. 1 shows this invention's incorporation into a typical physical modeling system which comprises a general or limited purpose computer (not shown) running a digital Logic Simulation Program 10, a Clock Controller 11, a plurality of RAM Pattern Buffers 12, and Pin Electronics 13. The Clock Controller 11 coordinates the loading of test patterns generated by the Simulation 10 into the Pattern Buffers 12. The Pin Electronics 13 develop appropriate pin driving signals to be applied to the pins of the Physical Model 14 in accordance with the test patterns stored in the Pattern Buffers 12. The Clock Controller 11 also coordinates the application of the signals developed by the Pin Electronic 13 to the Physical Model 14. Daisy Systems Corporation markets the Digital Design product, Model PL3/25 which has these features. The Daisy Systems Corporation simulation program, named "DLS2", and the clock controller, pattern buffers and pin electronics are included within the Daisy Systems Corporation Physical Modeling Extension (PMX) hardware.

The implementation of this invention requires enhancing the Clock Controller 11, adding the Signature Compare Logic 20-23, and adding code to the Simulation Program 10 to control the signature generation and signature compare. Also, the Simulation Program 10 should notify the simulation user of signature comparison errors after exceeding an acceptable retry count. The dashed line in FIG. 1 isolates this invention's enhancements in the bottom half.

Frequently during a simulation session (a complete start to finish operator interaction with the simulation program), the computer running the logic Simulation Program 10 computes an input change for a given physical model in the logic design. Thus begins a hardware device evaluation cycle to determine how the hardware device responds.

The newly computed physical model input value is appended to the corresponding physical model pin's Pattern Buffer 12 after all previously accumulated patterns for that pin. Other physical model pins are similarly loaded with their current simulation values. The Clock Controller 11 is programmed with Pin Electronics 13 clock data. The Simulation Program 10 may now start all the physical model pins, synchronously applying the accumulated simulation signal values stored in the Pattern Buffers 12 which are converted to digital voltage levels by the Pin Electronics 13 and delivered to the pins of the Physical Model 14, which is a real hardware device such as a microprocessor. The hardware device output responses are recorded in the Pattern Buffer 12 via the Clock Controller 11. The hardware device evaluation cycle ends when the entire sequence of patterns has been applied to the hardware device and the measured output responses have been recorded.

Next, the simulation program normally updates the corresponding simulation signal values after a programmed simulation time delay. These signal updates may directly or indirectly cause this or other physical model inputs to change, starting the whole process over again and again. In summary, a given physical model's pattern buffer is incrementally built up, one pattern at a time, by evaluating the hardware device response for each pattern iteration as simulation time advances.

The above-described process is used by the aforementioned Daisy Digital Design product and other commercially available products. But the process has the dependency that each and every device evaluation cycle produces identical results for the same patterns. Conditions that will cause erroneous simulation results include:

1. the hardware device does not reset the same way, or
2. a power supply glitch, or
3. a pattern buffer refresh at a critical time, or
4. an intermittent pin contact.

This invention insures reliable operation by comparing signatures associated with each hardware device evaluation cycle with signatures associated with the preceding device evaluation cycle. No simulation performance is lost because this embodiment uses hardware to automatically generate and compare signatures. Signatures are accurate and unique since only after the pin transitions to a stable one or zero logic voltage level will the signature clock pulse.

Figure 2:
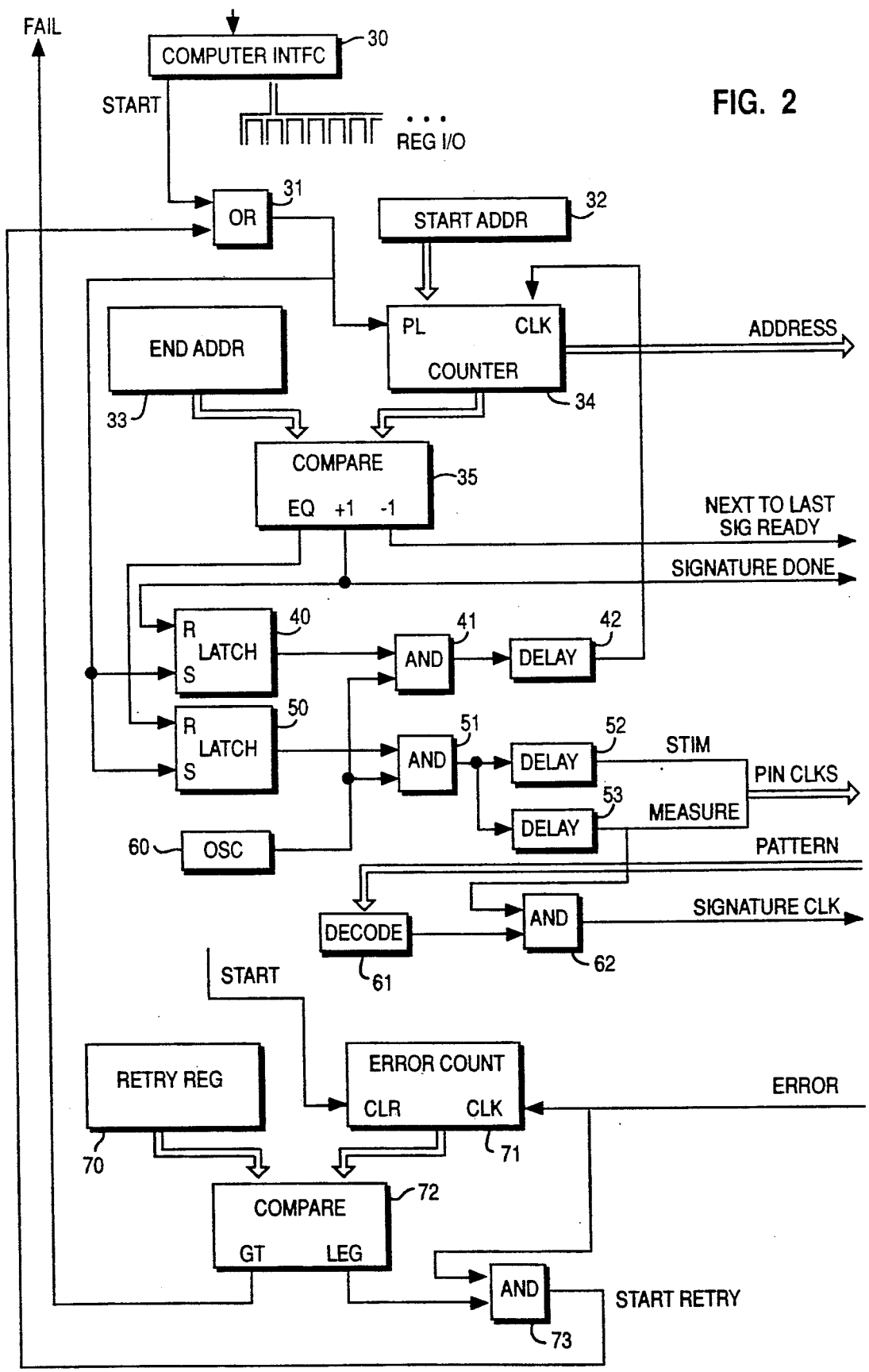
FIG. 2 is a detailed logic diagram which shows an implementation of the Clock Control 11 and its connection to the additional hardware enhancements of available simulation hardware.

FIG. 2 illustrates the detailed operation of the Clock Controller 11 of FIG. 1. The computer Simulation Program 10 causes predefined computer bus input/output cycles to the Computer Interface Logic 30. The Computer Interface Logic 30 may be one of many available computer adapter cards that can decode the predefined computer bus I/O cycles into signals similar to the "START" and "REG I/O" signals. For example, assuming that an IBM Personal Computer AT[1] is used as the computer hardware in this embodiment, the Computer Interface Logic may be an AST SixPakPlus[2] multifunction card from AST Research, Incorporated, which includes both RS-232 serial and parallel I/O ports.

[1] "Personal Computer AT is a registered trademark of International Business Machines Corporation. [2] "SixPakPlus" is a registered trademark of AST Research, Incorporated.

The computer Simulation Program 10 begins any device evaluation cycle by loading a Start Pattern Address Register 32, an End Pattern Address Register 33, an Address Increment Delay Register 42, a Stimulate Pin Clock Delay Register 52, a Measure Pin Clock Delay Register 53, and a Retry Count Register 70. Many of these registers do not have to be loaded every device evaluation cycle, since they will remain constant for the entire simulation session.

Once all the hardware registers and pattern buffers are loaded, the computer Simulation Program 10 sends the "START" command to the Computer Interface Logic 30 which pulses the Start signal. The Start signal causes the following:

1. the Address Counter 34 is loaded with the contents of the Start Address Register 32;
2. two latches 40 and 50 are set, and enable AND gates 41 and 51, respectively to gate pulses from an Oscillator 60; and
3. an Error Counter 71 is reset to zero.

The ensuing Oscillator 60 cycles cause the pin to be stimulated, the pin result to be measured, and the pattern buffer Address Counter 34 to be incremented each with an appropriate delay in accordance with the delays stored by Registers 42, 52, and 53.

The aforementioned sequence of operations is done by numerous physical modelers on the market today. This invention adds the following sequence: the AND gate 62 generates a signature clock only when the decoded 61 pattern from the pattern buffer 12 is so programmed by the simulation program (10). The simulation program may use the propagating signal value information (for example, signal values typically are defined as: U=unknown, X=transition, H=high impedance, 1=one logic state, and 0=zero logic state) and device pin specifications to determine at which patterns stable one or zero voltage levels exist. For the most unique signature generation, the simulation program (10) should only allow one signature clock while the pin is at a given stable one or zero voltage level. A key innovation of this invention is the ability to use existing simulation program data to automatically generate the signature clock pulses.

The Oscillator 60 causes patterns to continue being applied and recorded, and the signature 21 is updated until the Address Compare 35 generates the "Next to Last Sig Ready" signal. Now, simultaneous with the normal pattern cycle, the Signature Compare 23 is enabled so that the previous device evaluation cycle signature stored in Register 22 is compared to the current signature in Shift Register 21 (both in FIG. 1). If they do not exactly compare, then the Error Counter 71 is incremented and if the count is less than or equal to the retry register count in Register 70, then the clock control 11 automatically restarts the device evaluation all over again. If the error count in Counter 71 is greater than the retry register count in Register 70, then the Fail signal is reported back to the simulation program and the device evaluation cycle ends.

If the contents of Register 22 are equal to the current signature in Shift Register 21, then the last pattern cycles normally. The Address Counter 34 increments once more to generate the Signature Done signal which transfers the current signature in Shift Register 21 to Register 22. At the same time, the Oscillator 60 enable Latches 40 and 50 are reset so no more Pin Clocks are generated. This ends a normal device evaluation cycle.

Figure 3:
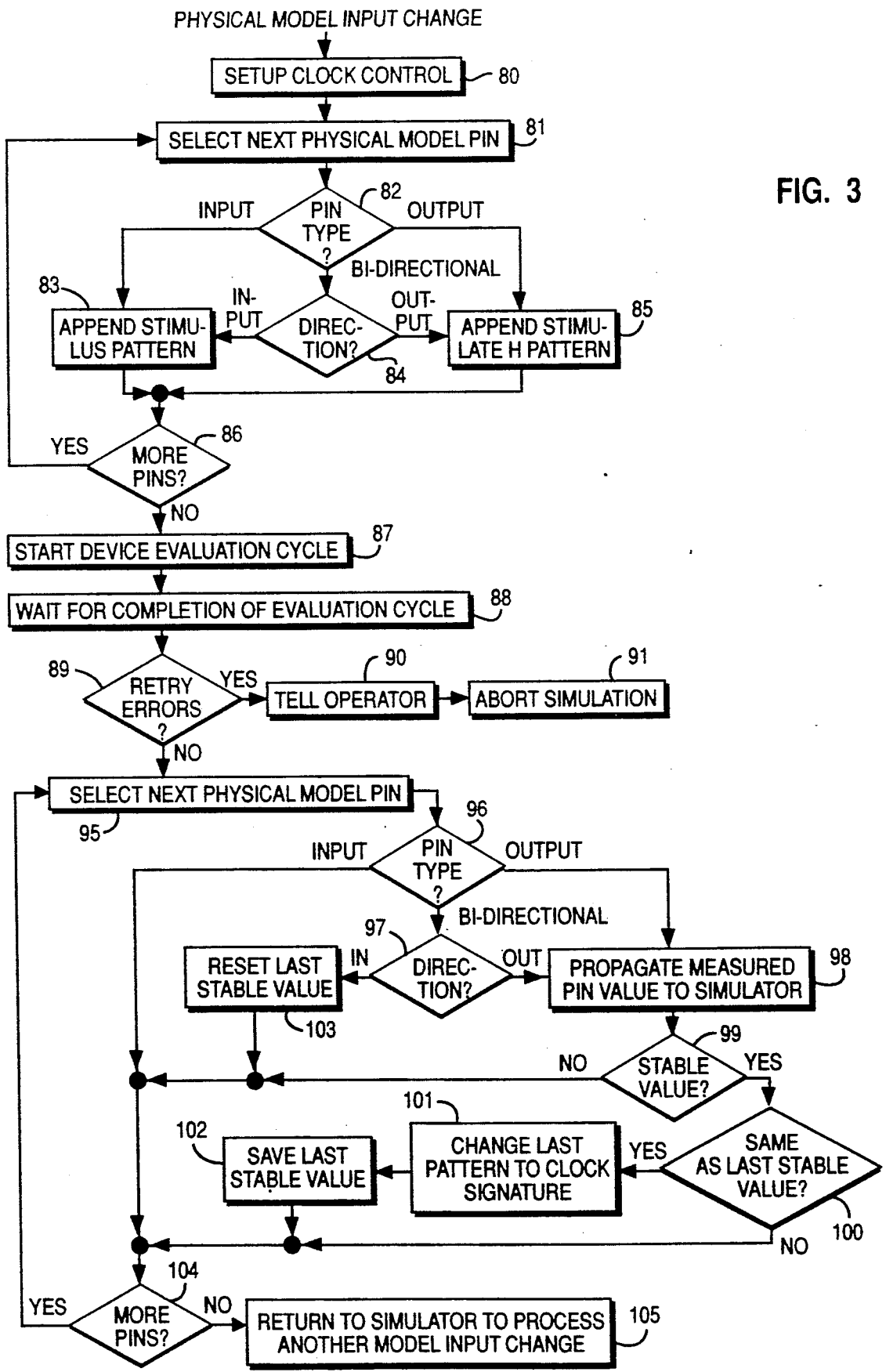
FIG. 3 is a flow diagram of the enhanced simulation program of this invention.

FIG. 3 illustrates how this invention affects the algorithm of the Simulation Program 10. Typically, a change in a signal in the logic design causes all the connected logic blocks to be evaluated. FIG. 3 begins when the changed signal is connected to a physical model.

At 80 setup of the Clock Controller 11 involves retrieving hardware configuration data and loading the appropriate values into the Start Address Register 32, End Address Register 33, Error Retry Register 70, and Delay Registers 42, 52, and 53, the purposes of which are described above relative to FIG. 2.

Flow chart blocks 81 through 86 iterate on each pin of the physical model. This loop appends the current simulation value as a stimulus pattern to the end of the Pattern Buffer 12. In most physical modeling systems, pins acting as outputs are loaded with the stimulate H (high impedance) value. The new pattern does not cause a signature clock to be generated for any pin.

Once all pins are set up, at 87 the START command is given to the Clock Controller 11 to begin another device evaluation cycle. At 88 the Simulation Program 10 waits for the hardware to complete stimulating and measuring the physical model. At 89 if the automatic retry count has been exceeded, then at 90 the operator is sent an error message and the simulation session is aborted at 91.

Otherwise, the simulation continues by propagating the individually measured device output pin responses 98 with operator adjustable delays. It does this by cycling through all pins in steps 95 through 104. In each iteration if, at 96, the pin is a bidirectional pin and, at 97, its direction is like a device output pin, or, at 96, the pin is an output pin, then the measured pin voltage level is converted to a simulation state (one, zero, or H state) and propagated to the simulation program after a predefined delay. The pin's delay is normally obtained from the device specifications or from an analysis program that estimates the delay based on how it is wired and placed in the logic design being simulated.

Also, if at 99 the pin acting as an output is now in a stable state, and at 100, if the stable state is different from the previously saved stable state for the pin, then its last stimulate H pattern (just loaded at 85) is changed at 101 to an encoded pattern that both stimulates H and causes a signature clock to be generated. This is shown in FIG. 2 wherein the measure pin clock signal from the Delay 53 is gated through the AND gate 62 when an appropriate pattern is received by the Decode 61. It will be remembered that patterns are appended to the end of the pattern buffer 12, so this pattern is set for the remainder of the simulation session.

To insure the generated signature contains all output change contributions, whenever the bidirectional pin is acting as an input, the saved last stable value is reset to null at 103 so that when it becomes an output, any stable value will cause a signature clock pattern to be generated.

A major feature of this invention is the determination of the stable output state at 99 and use of this information to generate unique signatures. This is accomplished with: (1) signal interdependency data obtained from the device specifications, and (2) the current simulation values sitting at the device inputs, as further described below.

The device timing delay specifications normally detail for each output a timing sequence of signals and identify the reference input signal that causes this output signal to transition. The physical model already uses this information to propagate output changes with appropriate delays. The model can use this same information to identify time periods in which the output may be in a state of transition and, therefore, not stable, and time periods in which the output cannot be in a state of transition and, therefore, is stable.

Additionally, the simulation program may propagate a U (Uninitialized state), an X (indeterminate state), or a T (transition state) when a signal is not in a stable state. Certainly, an output with its reference input signal in any of these unstable states cannot be in a stable state. Only when all signals defining the sequence that causes an output change are at the states defined as in the device specifications, should the corresponding output be determined to be in a stable state.

Thus, with this invention, the conservative, worst case scenario is used, to define when the output is stable. The reason is that after a short delay the output will most likely be in a stable state.

At 104, once all pins have been processed, the Simulation Program 10 continues at 105 to compute individual model responses to signal changes. The next signal change could be another model (or even the same physical model) input change which would start at step 80 of the device evaluation cycle, once again. When all the signal changes have been processed for a particular time, the simulation program must advance simulation time to the next time it finds a signal change that requires a physical model device evaluation cycle or behavior model computation. Thus the simulation session progresses until the operator's designated end simulation time, as is typical of all event driven simulation programs.

The following programming design language listing is another form of the description of the above-described enhanced simulation program of this invention. This listing parallels the operation described above for FIG. 3.

---

Physical Model Input Change

---

Load start pattern address register (32)
Load maximum Retry Error count register (70)
Get current pattern address
Load End Address register (33)
Do for all hardware pins for device
    Load Clock Control delay regs (42, 52, & 53)
    if input pin then do
        Get simulation signal value
    Load signal value at end of pattern buffer (12)
    end if input
    else if output pin then do
        Load signal value at end of pattern buffer (12)
    else if bi-directional pin then do
        if direction=output then
            Load H state value at end of pattern buffer (12)
        else if direction=input then do
            Get simulation signal value
            Load H state value at end of pattern buffer (12)
        end else if direction=input
    end if bi-di
end do for all hardware pins
START device evaluation cycle
WAIT for device evaluation cycle to complete
If retry count exceeded then do
    Print error message to operator
    Terminate simulation session
    end if retry count exceeded
Do for all hardware pins for device
    if output pin then do
        Propagate measured value to simulator with delay
        if output within stable period then do
            if measured value not equal last stable value
            then do Replace last pattern to generate
            Signature Clock
            Save current value as Last Stable State
            end if value not equal
        end if output stable
    end if output pin
    else if bi-directional pin then do
        if direction=input then do
            Load null into Last Stable State
        end if direction=input
        if direction=output then do
            Propagate measured value to simulator with delay
            if output within stable period then do
                if measured value not equal last stable value
                then do Replace last pattern to generate
                Signature Clock
                Save current value as Last Stable State
                end if value not equal
            end if output stable
        end if direction=output
    end if bi-di
end do for all hardware pins
Return to Simulation program (10)

---

In summary, computer simulation information is employed to determine the optimal times to clock signatures. This optimally generated signature is used to verify the consistent operation of the physical model. In performing a series of device evaluation cycles relative to pins of a physical device, the signature associated with a first set of patterns of the just previous evaluation cycle is compared to the signature that exists just prior to another, new pattern of the current evaluation cycle. If the signatures compare, the last pattern of the current evaluation cycle is completed. If the signatures do not compare, an error has occurred and the operator is notified so that this series of device evaluation cycles will not be considered valid.

This optimal signature clocking information may also be used in the field of testing. A computer simulation may accurately model or approximate circuit characteristics such as behavior function, physical layout, manufacturing process variations, wiring impedance, connector impedance, fanout, etc. The resulting signal pin activity may be analyzed to deduce indeterminate signal values due to signal pin transitions, unknown signal values, uninitialized signal values, and high impedance signal values. Therefore, a computer program could analyze the signal pin activity and produce the required input data for the programmable signature clock circuits. The signature clock should be programmed to clock, only once, each transition to a stable measurable signal value. This method will produce the most optimal unique signature result.

While the invention has been shown and described with reference to particular embodiments thereof, it will be understood by those skilled in the art that the foregoing and other changes in form and details may be made therein without departing from the spirit and scope of the invention.

We claim:

1. In a system for simulating or testing an electronic device including a physical model, a method for assuring integrity of a series of device evaluation cycles, comprising:

a) automatically generating a first signature summation of bits from a first pin of said model in response to application of a first set of patterns to said model;

b) appending another pattern to said first set of patterns to form a second set of patterns;

c) automatically generating a second signature summation of bits from said first pin of said model in response to application of said second set of patterns to said model before said another pattern is applied to said model during a next device evaluation cycle; and d) comparing said first signature summation of bits to said second signature summation of bits prior to application of said another pattern.

2. The method of claim 1 further comprising:

e) repeating steps a)–d) a predefined number of times if said comparing is not true.

3. The method of claim 2 further comprising:

f) halting steps a)–d) if said predefined number is reached.

4. The method of claim 3 wherein each of said patterns includes signature clock generation data for providing generation of said signatures.

5. The method of claim 4 wherein said signature clock generation data is derived from simulation signal values.

6. The method of claim 4 wherein said clock generation data is included with each of said patterns when said pin is at a stable one or zero logic state.

7. In a system for simulating or testing an electronic device including a physical model, the improvement for assuring integrity of a series of device evaluation cycles, comprising:
a) first means for automatically generating a first signature summation of bits from a first pin of said model in response to application of a first set of patterns to said model;
b) means connected to said first means for appending another pattern to said first set of patterns to form a second set of patterns;
c) second means connected to said first means for automatically generating a second signature summation of bits from said first pin of said model in response to application of said second set of patterns to said model before said another pattern is applied to said model during a next model evaluation cycle; and
d) means connected to said first and second means for comparing said first signature summation of bits to said second signature summation of bits prior to applying said another pattern.

8. The system of claim 7 wherein each of said patterns includes signature clock generation data for providing generation of said signatures.

9. The system of claim 8 wherein said signature clock generation data is derived from simulation signal values.

10. The system of claim 8 wherein said clock generation data is included with each of said patterns when said pin is at a stable one or zero logic state.

* * * * *